US012518548B2

United States Patent
Amthor et al.

(10) Patent No.: US 12,518,548 B2
(45) Date of Patent: Jan. 6, 2026

(54) MICROSCOPY SYSTEM AND METHOD FOR PROCESSING A MICROSCOPE IMAGE

(71) Applicant: Carl Zeiss Microscopy GmbH, Jena (DE)

(72) Inventors: Manuel Amthor, Jena (DE); Daniel Haase, Zoellnitz (DE)

(73) Assignee: Carl Zeiss Microscopy GmbH, Jena (DE)

( * ) Notice: Subject to any disclaimer, the term of this patent is extended or adjusted under 35 U.S.C. 154(b) by 551 days.

(21) Appl. No.: 17/683,133

(22) Filed: Feb. 28, 2022

(65) Prior Publication Data

US 2022/0284616 A1 Sep. 8, 2022

(30) Foreign Application Priority Data

Mar. 2, 2021 (DE) ...................... 10 2021 105 020.0

(51) Int. Cl.
*G06K 9/00* (2022.01)
*G06T 3/40* (2006.01)
(Continued)

(52) U.S. Cl.
CPC .............. *G06V 20/695* (2022.01); *G06T 3/40* (2013.01); *G06T 7/0012* (2013.01); *G06T 7/62* (2017.01);
(Continued)

(58) Field of Classification Search
CPC . G06T 2207/10056; G06T 2207/20081; G06T 3/40
See application file for complete search history.

(56) References Cited

U.S. PATENT DOCUMENTS

2020/0008779 A1* 1/2020 Göksel ................ G01S 15/8993
2020/0057921 A1* 2/2020 Navarrete Michelini ...................
G06V 10/764
(Continued)

FOREIGN PATENT DOCUMENTS

DE 10160179 A1 7/2003
DE 102019220168 A1 6/2021
(Continued)

OTHER PUBLICATIONS

Gómez-de-Mariscal, E., Maška, M., Kotrbová, A., Pospíchalová, V., Matula, P., & Munoz-Barrutia, A. (2019). Deep-learning-based segmentation of small extracellular vesicles in transmission electron microscopy images. Scientific reports, 9(1), 13211. (Year: 2019).*
(Continued)

*Primary Examiner* — Molly Wilburn
*Assistant Examiner* — Aidan Keup
(74) *Attorney, Agent, or Firm* — LaBatt, LLC

(57) ABSTRACT

Processing a microscope image includes forming an input image from a microscope image before the input image is input into an image processing program. The image processing program comprises a learned model for image processing which is trained with training images that show structures with certain image properties. The image processing program calculates an image processing result from the input image. The microscope image is converted into the input image by an image conversion program in such a manner that image properties of structures in the input image are modified with respect to image properties of the structures of the microscope image so that they are closer to the image properties of the structures of the training images.

22 Claims, 9 Drawing Sheets

(51) Int. Cl.
*G06T 7/00* (2017.01)
*G06T 7/62* (2017.01)
*G06V 20/69* (2022.01)

(52) U.S. Cl.
CPC ............... *G06T 2207/10056* (2013.01); *G06T 2207/20016* (2013.01); *G06T 2207/20081* (2013.01); *G06T 2207/30024* (2013.01); *G06T 2207/30242* (2013.01)

(56) References Cited

U.S. PATENT DOCUMENTS

| | | | |
|---|---|---|---|
| 2020/0160530 A1 | 5/2020 | Mehnert et al. | |
| 2021/0073959 A1* | 3/2021 | Elmalem | G06N 3/084 |
| 2021/0407072 A1* | 12/2021 | Ben Baruch | G06F 18/214 |
| 2023/0030424 A1* | 2/2023 | Ozcan | G06F 18/24137 |

FOREIGN PATENT DOCUMENTS

| | | |
|---|---|---|
| EP | 3748574 A1 | 12/2020 |
| WO | 2019007632 A1 | 1/2019 |

OTHER PUBLICATIONS

Search Report for DE 10 2021 105 020.0, Nov. 10, 2021, 7 pages (no English translation available).
"Neuronale Netze und andere Verfahren zur Gesichtserkennung in der Heimautomatisierung" by Constantin Kirsch of Aug. 29, 2017, 109 pages, English translation of chapters 2.2.1 and 2.2.2 (4 pages).
Office action for German Patent Application No. 10 2021 105 020.0 with English translation, Jul. 25, 2025, 16 pages.
Shorten et al., "A survey on image data augmentation for deep learning," Journal of Big Data, 2019, 48 pages.
Hollandi et al., nucleAIzer: A Parameter-free Deep Learning Framework for Nucleus Segmentation Using Image Style Transfer, Cell Systems, vol. 10, May 20, 2020, pp. 453-458.

* cited by examiner

MICROSCOPY SYSTEM AND METHOD FOR PROCESSING A MICROSCOPE IMAGE

REFERENCE TO RELATED APPLICATIONS

The current application claims the benefit of German Patent Application No. 10 2021 105 020.0, filed on 2 Mar. 2021, which is hereby incorporated by reference.

FIELD OF THE DISCLOSURE

The present disclosure relates to a microscopy system and a method for processing a microscope image.

BACKGROUND OF THE DISCLOSURE

Machine-learned models are increasingly being exploited in modern microscopes as well as in the processing and assessment of captured microscope images. Specific applications include a plurality of different processes, for example noise suppression, resolution enhancement, a detection of objects and outputting of the same in the form of segmentation masks, or a classification of image content according to essentially any classification criteria.

In a generic method for processing a microscope image, a microscope image is received or acquired. An input image formed from the microscope image is input into an image processing program. The image processing program comprises a learned model for image processing which is learned with training images that generally show structures with certain image properties. By means of the image processing program, an image processing result is calculated from the input image. The image processing result can take the form of, inter alia, the examples cited in the foregoing, e.g., a result image with reduced image noise or a segmentation mask.

Accordingly, a generic microscopy system comprises a microscope for capturing a microscope image and a computing device. The computing device comprises an image processing program that is configured to process an input image formed from the microscope image into an image processing result. The image processing program comprises a learned model for image processing which is learned with training images that show structures with certain image properties.

A fundamental problem that can occur is explained with reference to FIGS. 1 to 4. These figures illustrate background information from studies preceding the invention and do not necessarily depict published prior art. FIG. 1 schematically shows a microscope image 10 in which a sample carrier 7 with a sample 5 is visible. The sample carrier 7 is a transparent slide with a cover slip here, the sample 5 taking the form of biological cells located there between. As illustrated, the sample carrier 7 can comprise a labelling field and areas of different colours or different transparencies. A detection and assessment of the sample 5 in the microscope image can be hampered by impurities, reflections, irregular illumination properties or on account of a background visible through the transparent slide. In FIG. 1, the microscope image 10 is fed to an image processing program B as input image 10A. In the example shown, the image processing program B is a learned model M with a neural network, e.g. a CNN (convolutional neural network), which is trained to calculate a segmentation mask from an input image. The image processing program B thus calculates, from the input image 10A, a segmentation mask 20A in which different objects are labelled by different pixel values. A certain pixel value indicates that corresponding pixels form a segmentation area 21 that have been identified as belonging to the sample 5, while another pixel indicates a background 22. The segmentation mask 21 in FIG. 1 is visibly erroneous. A plurality of image areas that do not show a sample have been incorrectly identified as segmentation areas 21 of a sample. In addition, the segmentation areas 21 that actually correspond to the sample 5 contain gaps where the sample 5 was not detected.

FIG. 2 illustrates a case in which the microscope image 10 of FIG. 1 has been rescaled or resized, i.e. modified in terms of its size (pixel count/number of pixels or image resolution). Edge lengths of this resized image are 65% of the edge lengths of the microscope image 10. The resized image is fed to the image processing program B as input image 10B. The image processing program B is identical to the image processing program B of FIG. 1. The resulting segmentation mask 20B differs substantially from the segmentation mask 20A of FIG. 1. It is thus evident that the size of the input image has a considerable influence on the result of the image processing program B. The marginal difference in the information content of the input images 10A and 10B due to the different image resolutions does not explain these results. The fact that the CNN of the image processing program B comprises a plurality of convolutional layers in which, e.g., a 3×3 matrix or a 5×5 matrix is slid over the input image (or images calculated from the same) can be considered a more helpful explanation in this case. The size of the 3×3 matrix relative to the size of the structure (e.g. the pixel count or number of pixels of the diameter of the sample 5) has a considerable influence on the result. Consequently, image areas of the sample 5 in the input images 10A and 10B are processed very differently depending on their image size.

This circumstance is further illustrated in FIGS. 3 and 4, in which the microscope images 10 have been respectively rescaled by different factors. In FIG. 3, the microscope image 10 has been reduced to 35% of its size and the resulting image is fed to the image processing program B as input image 10C. In FIG. 4, the microscope image 10 has been reduced to 25% of its size and the resulting image is fed to the image processing program B as input image 10D. The generated segmentation masks 20C and 20D again clearly differ from one another and from the segmentation masks 20A and 20B. Only the segmentation mask 20C indicates the segmentation areas 21 and the background 22 without error.

This example illustrates the difficulty of providing a robust image processing program capable of processing a plurality of diverse microscope images correctly. In principle, it is possible to cover a plurality of different cases by means of particularly extensive training data. However, the training thereby becomes intrinsically complex while the provision of the training data likewise requires a considerable amount of time and effort.

SUMMARY OF THE DISCLOSURE

It can be considered an object of the invention to provide a microscopy system and a method which enable a correct image processing in a particularly robust manner for a plurality of diverse microscope images.

This object is achieved by means of the method and the microscopy system of the invention.

According to the invention, in the method of the aforementioned type, the microscope image is converted into the input image by means of an image conversion program in such a manner that image properties of structures in the input image are modified with respect to image properties of the structures of the microscope image so that they are closer to the image properties of the structures of the training images of the learned model of the image processing program.

Accordingly, in the microscopy system of the aforementioned type, it is provided that the computing device comprises an image conversion program configured to convert the microscope image into the input image in such a manner that image properties of structures in the input image are modified with respect to image properties of the structures of the microscope image so that they are closer to the image properties of the structures of the training images.

According to the invention, a microscope image is first converted before being input into the image processing program so that image properties of depicted structures become more similar to those of the training data used. A reliability of a correct image processing increases with an increasing degree of similarity to the training data. An image property of a depicted structure can be, for example, the size in image pixels of a depicted biological sample. This size can be, e.g., 200 pixels in a microscope image while in training images biological samples predominantly exhibited a size between 20 and 30 pixels. The size of the microscope image is reduced in this case so that the size of the depicted sample becomes more similar to the size of the samples in the training images. The conversion of a microscope image into an input image thus occurs as a function of the image content of the microscope image so that image properties of depicted structures become more similar to the image properties of the corresponding structures of the training images.

Optional Embodiments

Variants of the microscopy system according to the invention and of the method according to the invention are the object of the dependent claims and are explained in the following description.

Image Properties of Depicted Structures

Image properties of depicted structures can in particular be geometry properties and/or brightness properties of the structures. Geometry properties of the structures can be understood to be a size, an orientation or alignment, and/or an image distortion. Indications of the same relate to the corresponding image; i.e., it is not the physical size of a structure that is intended, e.g. the physical size of 30 µm of a biological cell, but its pixel size in the image, which can be, e.g., 40 pixels in diameter. The size can be understood to be a diameter, area or some other measure of an extension of a structure. The orientation likewise does not indicate the physical orientation of a structure in space, but the orientation of the depicted structure in the image, e.g. relative to an image edge. An image distortion can result, e.g., from a perspective view. For example, if a camera views a rectangular object (e.g. a slide of a microscope) at an oblique angle, then opposite edges of the rectangular object are not necessarily parallel to each other and the corners do not form right angles in the depiction of this structure.

Brightness properties of a structure can relate to, e.g., a tone value or grey value, a brightness, a saturation or an image contrast of the structures. A distribution of the cited characteristics can also be comprised, e.g. a brightness distribution within a structure.

The image properties of the structures do not relate to the entire image, but only to certain structures. It is not intended, for example, that a microscope image should necessarily be modified in its entirety so that its size corresponds to the image size of the training images. In principle, these image sizes can differ from one another arbitrarily. Rather, the sizes of the depicted structures should be made to converge. It is likewise not the entire microscope image that is paramount for a contrast processing or brightness processing, but the brightness or the contrast of structures that are also represented in the training images. For example, the brightness of biological cells in a microscope image should be made to converge with the brightness of biological cells in training images. A modification of the brightness or contrast can potentially lead to an oversaturation in other areas of the microscope image so that an overall image quality may appear worse, yet can still be more suitable for the processing by the image processing program.

In accordance with the examples cited above, a modification of the image property can be or comprise a rescaling/resizing, an image rotation, a (perspective) distortion, compression, warping/shear mapping, optical distortion or reflection, a modification of the brightness values, contrast values or tone values, or a gamma correction.

Depicted Structures

Depicted structures in a microscope image and in the training images can be, e.g., biological samples, cells or cell organelles, tissue sections, liquids, rock samples, electronic components, sample carriers, sample carrier holders or sections or parts of the same. Image properties of these structures are particularly relevant for a correct processing by the image processing program.

Image Conversion Program

The image conversion program converts one or more of the aforementioned image properties. An image content of a microscope image can otherwise remain unmodified. For example, the image conversion program modifies the image property "size" as a function of the size of depicted structures, without necessarily performing further processing operations.

In one example, the image conversion program is designed to first determine the image properties of structures in the microscope image. In particular, the sizes of cells, objects or other structures in the microscope image can be determined in pixels. Target image properties can be predetermined for image properties of structures of the microscope image, e.g. target sizes of the cells or objects, which can be specified as a target pixel count. In order to calculate the input image from the microscope image, the image conversion program now modifies the determined image properties to the target image properties. For example, in order to modify the size of cells in the overview image, a resizing of the microscope image is carried out so that the size of the cells subsequently (in the input image) ideally corresponds to the target size. In this example, the image conversion program is thus able to calculate a scaling factor by means of which the determined size of the structures is converted to the target pixel count, and the image conversion program subsequently enlarges or reduces the microscope image by the scaling factor in order to generate the input image.

This resizing or rescaling can occur by means of any scaling method, e.g., by means of an interpolation such as a (bi-)linear, bicubic or nearest neighbour interpolation.

In a variant of the above embodiment, target image properties for the structures are not specified; instead, the modification to be performed is predetermined as a direct function of the determined image property. For example, a scaling factor for the microscope image can be predetermined as a function of the size of the structure in pixels in the microscope image.

The image conversion program can also comprise a learned model for determining image properties. The learned model has been trained in a training using images to determine image properties of structures of microscope images. The model can be designed, e.g., as a CNN trained to determine a size of biological cells in input images. The learned model for determining image properties is independent of the model for image processing of the image processing program. The training processes of these models are likewise independent of one another and the training images of one model can be different from the training images of the other model. In training images of the model for determining image properties, the image properties can be specified in the form of annotations or "ground truth". In the case of an orientation of a structure (e.g. of a sample carrier), an orientation of the structure can be, for example, measured manually in the training images and then recorded in the form of an annotation.

There does not necessarily have to be an intermediate step in which an image property of certain structures is determined and output explicitly. Especially when the image conversion program takes the form of a learned model, it is sufficient if the conversion of an input microscope image is performed as a function of image properties of certain structures of the microscope image, whereby an explicit labelling of these image properties is not necessary. Specifically, the image conversion program can be a learned model for image conversion that is learned using images for which it is specified in the form of annotations how these images are to be converted in order to form input images. For example, in the training of the model for image conversion, a scaling factor can be specified as a target or annotation for each of the microscope images input into the model. The model thereby learns to calculate a scaling factor for a microscope image not seen in the training. In principle, the annotated scaling factor for the training images can be determined in any manner: In a simple case, a plurality of scaling factors are applied to a training image in order to calculate differently scaled images, which are subsequently respectively fed to the image processing program. Results of the image processing program are evaluated (manually or automatically). The scaling factor of the image for which the image processing result with the best evaluation was obtained is then used as the annotation of the training image. An analogous approach can be employed with other image properties, e.g. in order to determine an angle of rotation instead of or in addition to the scaling factor.

Alternatively, the image conversion program can test a plurality of potential conversions in order to determine a suitable conversion of the microscope image into the input image. The potential conversions are respectively applied to the microscope image in order to generate potential input images for the image processing program. Image properties of structures of the potential input images are then evaluated according to a predetermined criterion. The potential input image with the best evaluation is selected as the input image. For example, a plurality of scaling factors can be tested. A plurality of potential input images are generated with the scaling factors. For the evaluation of the potential input images, an estimation or evaluation of the size of image structures is carried out. This can occur, e.g., by convolution with a template that has one or more structures of a predetermined (desired) size. The convolution yields a large amplitude/peak when the size of the image structures corresponds to the structure size of the template. It can thereby be determined which of the potential input images comprises structures that are closest in size to a desired size in pixels. Specifically, it can be known, e.g., that the image processing program is capable of processing objects of a certain size reliably, e.g. with a diameter of 50 pixels, whereas errors occur in cases of large size discrepancies. The template can comprise a structure, e.g. a circle or a square, of this size (50 pixels). A 2D convolution between the template and a potential input image yields a maximum, which is all the greater, the more accurately the structure of the template corresponds to a structure in the potential input image. It is thus possible to determine the potential input image the structures of which are most likely to have the desired size (50 pixels). In a variant of this embodiment, a plurality of templates which differ in the size of their structure can respectively be convolved with the microscope image in order to establish with which template there is the best size correspondence of structures of the microscope image.

In different described embodiments, the image conversion program determines a conversion to be performed based on the structures in the microscope image that correspond to the structures of the training images, e.g. based on biological cells or material samples depicted in the microscope image as well as in the training images. The embodiments described in the foregoing can also be varied, however, so that the image conversion program determines image properties of objects in the microscope image that do not correspond to the structures of the training images. For example, the structures of the training images can be material samples (e.g. different types of rocks). Although the microscope images also show corresponding structures, in this example material samples, image properties of other objects are used instead, e.g., image properties of a screw of a holder of the material sample. The object size can be determined in pixels, i.e. the number of pixels that constitute the screw in the microscope image. A scaling factor is established as a function of this object size, for example so that an image (input image) is calculated in which the screw is always rescaled to a size/diameter of 20 pixels. The entire image content—consequently also the depicted structure, in this case the material sample—is thus rescaled. The image areas of screws or holders can be immaterial for the image processing program used subsequently so that an image cropping optionally occurs, whereby the structures of interest (material samples) remain in the input image while image areas of the screw are cropped. It is also achieved thereby that image properties of structures of the microscope image (here: size of the material samples in pixels) are modified so as to be closer to the image properties of the structures of the training images, i.e. closer to the size in pixels of the material samples of the training images in this example. This conversion does not occur based on the image properties of the material sample, but based on the image properties of other objects that do not need to be present in the training images.

The image conversion program can optionally also determine a confidence level for a determined input image, a determined image property of the microscope image or for a conversion to be performed, for example a possible scaling. If a similar confidence level is determined for different conversions, e.g. different scaling factors, it is also possible to generate a plurality of input images by means of these conversions and to input each of the generated input images into the image processing program. The resulting image processing results can be respectively presented to a user or an average can be determined and utilized in further process steps.

Contextual Information

The image conversion program can optionally also take into account contextual information regarding the microscope image when calculating the input image. In particular, the contextual information can indicate one or more of the following: microscope settings, a magnification of an employed objective, illumination properties or camera properties, information regarding a measurement situation at the capture of the microscope image, an employed sample carrier type or an employed sample type. In cases where the image conversion program or a part of the image conversion program takes the form of a learned model, the contextual information can be input in the training together with the associated training images. A model is thereby learned which can also take into account the corresponding contextual information. Contextual information such as, e.g., the employed sample carrier type or the employed sample type can optionally be determined in the microscope image or another microscope image in a separate step. Different sample carrier types include, e.g., microtiter plates, slides, chamber slides and Petri dishes with one or more compartments. Different sample types can include, among other things, different cell types, cell organelles, types of rock, semiconductors or electronic components. Knowing the aforementioned contextual information can, among other things, help in a size estimation in order to determine a scaling factor.

Image Processing Program

The image processing program can be designed for in principle any kind of image processing and, depending on its design, output, e.g., at least one result image, a one-dimensional number or a classification as the image processing result. It comprises a learned model for image processing which calculates, based on the input image, in particular an image segmentation, a detection, a classification, an image enhancement, a reconstruction of image areas or an image-to-image mapping. An image-to-image mapping can in particular be a so-called "virtual staining", in which a depiction is generated that resembles a depiction by some other microscopy method; for example, a result image that resembles a DIC image (differential interference contrast image) can be calculated from a DPC image (differential phase contrast image) and used as an input image. A one-dimensional number can be, e.g., a number of counted objects, which is the case, for example, when the image processing program is configured to count biological cells or cell organelles within an image. In a classification, the input image is grouped into one of a plurality of predetermined classes. The classes can indicate, e.g., a sample carrier type or a sample type, or a quality evaluation of the input image, for example whether it appears suitable for further image processing operations. The image enhancement cited in the foregoing can be, for example, a reduction of image noise, a deconvolution, a resolution enhancement, an artefact removal or a suppression of interfering image content. The reconstruction of image areas can be understood in particular as a filling in of missing areas in the input image. Missing areas can arise, e.g., due to covers or unfavourable lighting.

The processing of a single input image by the image processing program has been described for the purposes of illustration. Depending on the image processing program, it is however also possible to provide that a plurality of input images are input together and that a common image processing result or a plurality of result images are calculated therefrom. In such cases, a plurality of microscope images are processed in the described manner into a plurality of input images. Singular forms are thus intended to cover the variant "at least one" in addition to the meaning of "exactly one".

If the image processing result takes the form of a result image, then a reverse transformation program can optionally perform a conversion of the result image that is the inverse of the conversion by means of which the image conversion program generated the input image from the microscope image. If a scaling factor of, e.g., 0.4 is applied to the microscope image (i.e. a reduction of the image size to 40% is effected), then the resulting image is rescaled by the inverse of the scaling factor (i.e. 1/0.4=2.5 in this example). If the microscope image is rotated clockwise by an angle of rotation in order to generate the input image, then the result image is rotated counterclockwise by the angle of rotation. The application of these measures prevents a discrepancy between the image processing result and the original microscope image which could potentially compromise further automated data processing operations.

Joint Model for Image Conversion and for Image Processing

The image conversion program can be or comprise a model for image conversion that is or was learned together with the model for image processing. The two models thus constitute submodels or subunits of a joint model. A joint training occurs with a joint optimization function in order to learn the model for image conversion and the model for image processing. By means of the joint training, both models are learned simultaneously and interdependently. The training images described in the foregoing each comprise two annotations in this case: an annotation in the form of a target of the image conversion (e.g. a predetermined scaling factor) and an annotation in the form of a target of the image processing (e.g. a segmentation mask or a noise-reduced image). The optimization function, for example a loss function, includes an expression that describes a deviation of an output of the model for image conversion from the associated annotation and an expression that describes a deviation of an output of the model for image processing from the respectively associated annotation. By means of the annotations for the image conversion (e.g. scaling factors), a more uniform depiction is achieved (for example, in the case of scaling factors, similar pixel sizes of biological cells in different images). Within certain limits, a user is free to determine which depiction is used as the uniform depiction. For example, in the case of a scaling, a similar pixel size of cells is desirable in different images while the exact value of this pixel size is less relevant. By means of the joint training, the model for image processing can learn to react to the range of outputs of the model for image conversion. If the model for image conversion generates an output in the training that deviates more widely from the predetermined annotation/ground truth, the model for image processing is trained to be able to process such deviating cases passably too. A higher robustness can thereby potentially be achieved compared with cases of separate learning processes for the two models. Upon completion of the joint training, the model for image conversion and the model for image processing can be concatenated to form a single model. An explicit output or storage of a scaling factor or of a microscope image resized by the scaling factor is not necessary.

General Features

A microscopy system denotes an apparatus that comprises at least one computing device and a microscope. A microscope can in particular be understood to be a light microscope, an X-ray microscope, an electron microscope or a macroscope.

The computing device can physically be part of the microscope or be arranged separately in the vicinity of the microscope or at a remote location at any distance from the microscope. The computing device can also be designed to be decentralized. It can generally be formed by any combination of electronics and software and comprise in particular a computer, a server, a cloud-based computing system or one or more microprocessors or graphics processors. The computing device can also be configured to control the sample camera, the overview camera, image capture, the sample stage drive and/or other microscope components.

The sample can be any sample and can comprise, for example, biological cells or cell parts, material or rock samples, electronic components and/or objects held in a liquid.

A microscope image in the present disclosure can essentially be any raw image captured by a microscope or can be a processed image. The processed image can be derived from one or more raw images or pre-processed images of a microscope. For example, a microscope image can be a perspective-transformed image and/or is formed by joining together a plurality of raw images showing sample areas that overlap laterally. The microscope image can also be calculated by image segmentation or a brightness adjustment or contrast adjustment. The microscope image can in particular be an overview image or a sample image or an image derived from the same. An overview image is understood to be an image captured by an overview camera, which can be provided in addition to a sample camera of the microscope with which images of a sample area are captured with a higher magnification (sample images). The overview camera can be mounted on a stationary device frame, e.g. a microscope stand, or on a movable component, e.g. a sample stage, focus drive or objective revolver. The acquisition of an image can in particular comprise the loading of an existing image from a memory or the capture of an image with a camera.

A computer program according to the invention comprises commands that, when executed by a computer, cause the execution of one of the described method variants.

The learned models or machine learning models described in the present disclosure respectively denote a model learned by a learning algorithm using training data. The machine learning models can, for example, respectively comprise one or more convolutional neural networks (CNNs), which receive at least one image as input. The training of a machine learning model can have been carried out by means of a supervised learning process in which training images with an associated annotation/labelling were provided. A learning algorithm is used to define model parameters of the machine learning model based on the annotated training data. A predetermined objective function can be optimized to this end, e.g. a loss function can be minimized. The loss function describes deviations between the predetermined labels or annotations and current outputs of the machine learning model, which are calculated with the current model parameter values from input training data. The minimization allows the model to generate outputs that are closer and closer to the predetermined labels in successive iterations. The model parameter values are modified to minimize the loss function, said modifications being calculated, e.g., by gradient descent and backpropagation. In the case of a CNN, the model parameters can in particular include entries of convolution matrices of the different layers of the CNN. Other deep neural network model architectures are also possible instead of a CNN. Instead of a supervised learning process, it is also possible to carry out an unsupervised training in which an annotation of the training images does not occur. A partially supervised training or a reinforcement learning is also possible.

The characteristics of the invention that have been described as additional apparatus features also yield, when implemented as intended, variants of the method according to the invention. Conversely, a microscopy system can also be configured to carry out the described method variants. In particular, the computing device can be configured to carry out the described method variants and/or output commands for the execution of described method steps. The computing device can also comprise the described computer program. While a ready-trained model is used with some variants, other variants of the invention result from the implementation of the corresponding training steps.

BRIEF DESCRIPTION OF THE DRAWINGS

A better understanding of the invention and various other features and advantages of the present invention will become readily apparent by the following description in connection with the schematic drawings, which are shown by way of example only, and not limitation, wherein like reference numerals may refer to alike or substantially alike components.

DETAILED DESCRIPTION OF EMBODIMENTS

Different example embodiments are described in the following with reference to the figures.

FIG. 5

Figure 1:
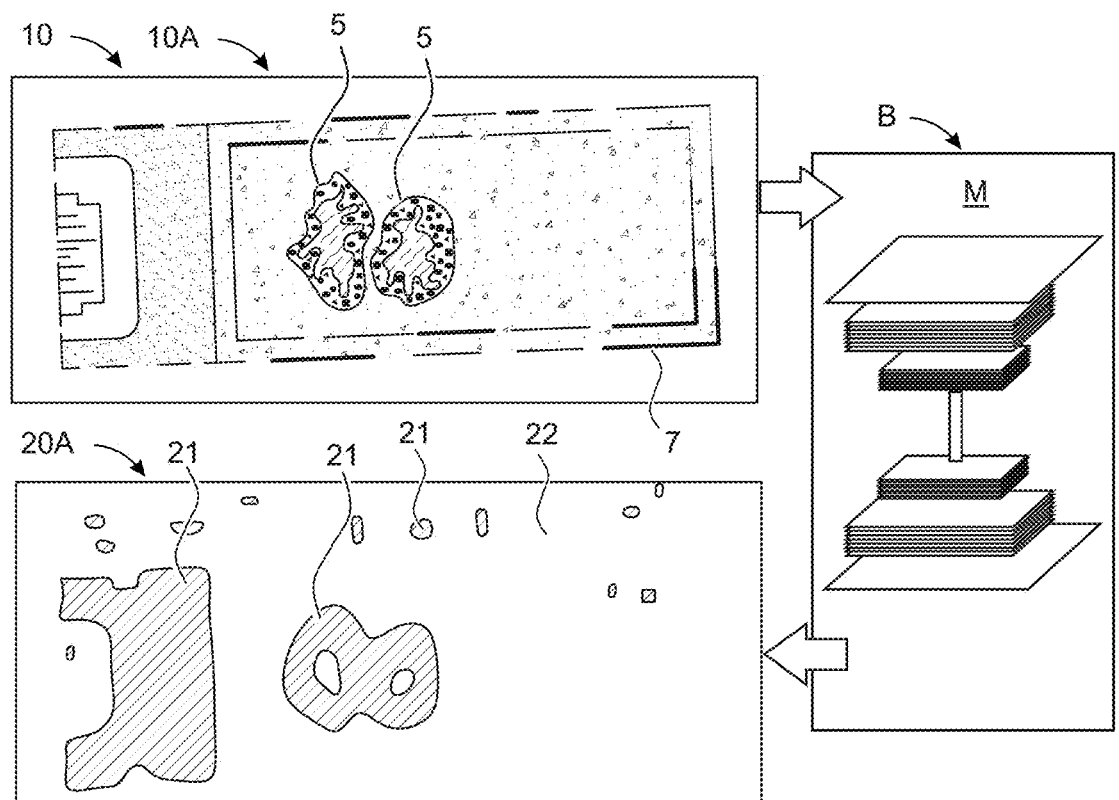
FIGS. 1 to 4 respectively schematically illustrate the processing of an image by an image processing program.
Figure 2:
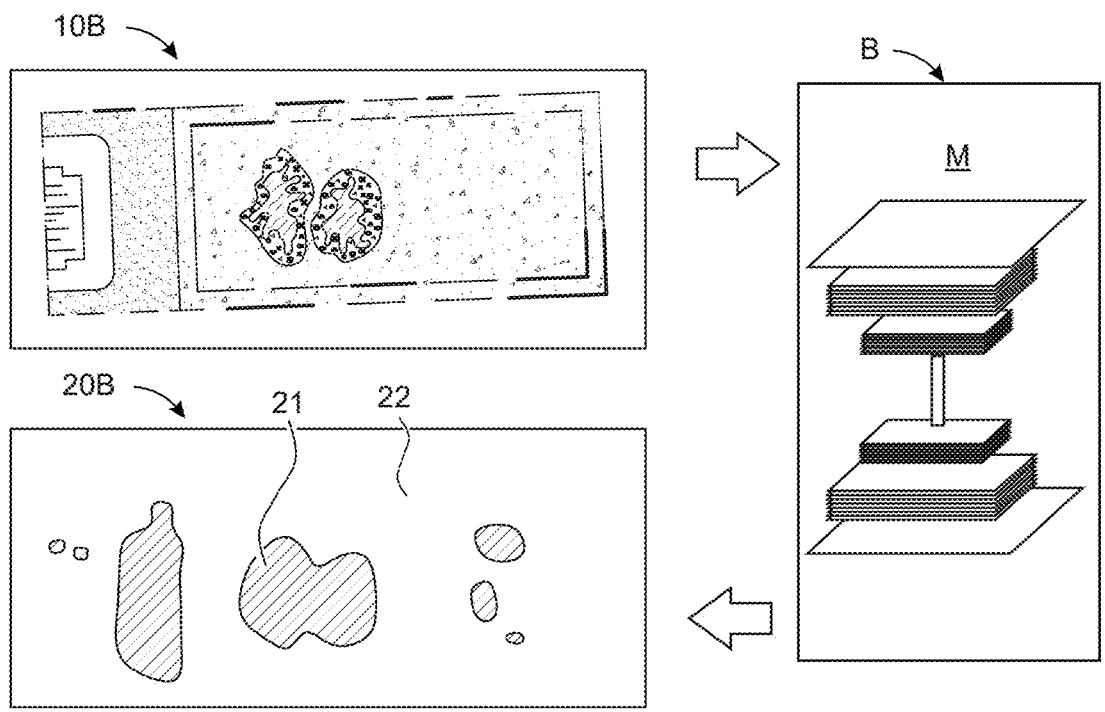
Figure 3:
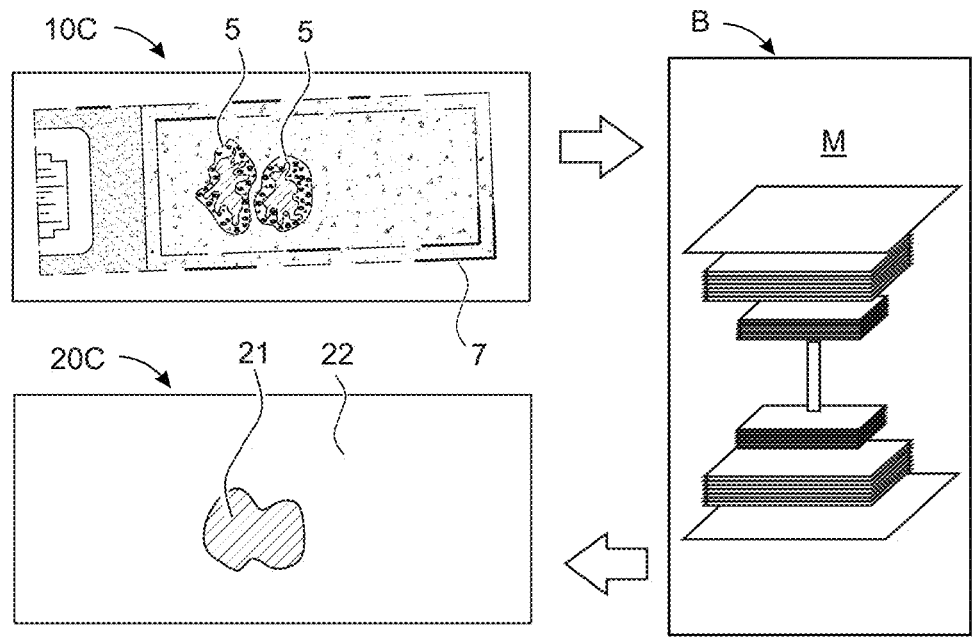
Figure 4:
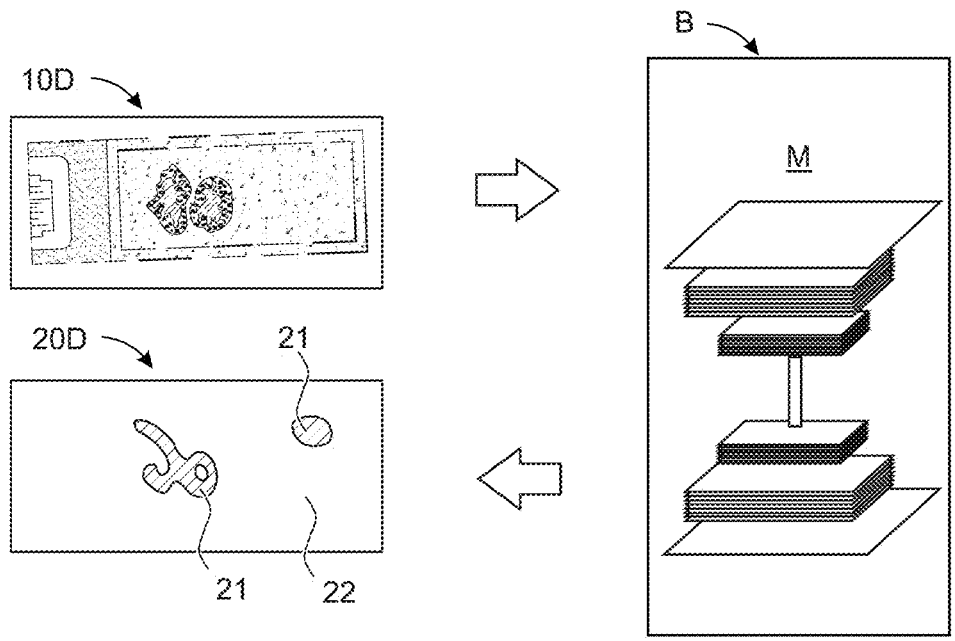
Figure 5:
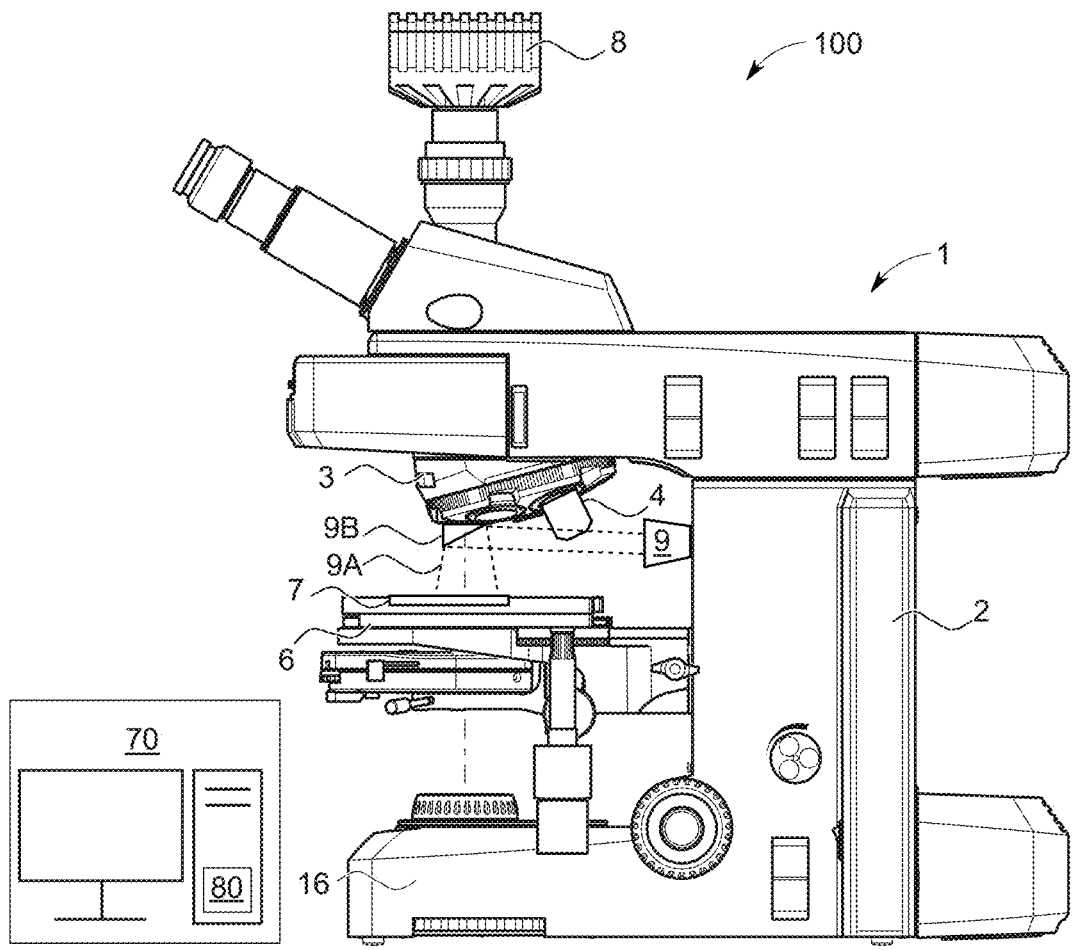
FIG. 5 schematically shows an example embodiment of a microscopy system of the invention.

FIG. 5 shows an example embodiment of a microscopy system 100 according to the invention. The microscopy system 100 comprises a computing device 70 and a microscope 1, which is a light microscope in the illustrated example, but which in principle can be any type of microscope. The microscope 1 comprises a stand 2 via which further microscope components are supported. The latter can in particular include: an illumination device 16; an objective changer/revolver 3, on which an objective 4 is mounted in the illustrated example; a sample stage 6 with a holding frame for holding a sample carrier 7; and a microscope camera 8. If the objective 4 is rotated so as to be located in the microscope light path, the microscope camera 8 receives detection light from a sample area, in which a sample can be located, in order to capture a sample image. A sample can be any object, fluid or structure. The microscope 1 also comprises an overview camera 9 for capturing an overview image of a sample environment. The overview image can thus show in particular the sample carrier 7 or a part of the same. A field of view 9A of the overview camera 9 is larger than a field of view when a sample image is captured. In the illustrated example, the overview camera 9 views the sample carrier 7 via a mirror 9B. The mirror 9B is arranged on the objective revolver 3 and can be selected instead of the objective 4. In variants of this embodiment, the mirror or some other deflection element can also be arranged at a different site. Alternatively, the overview camera 9 can also be arranged on the stand 2, objective revolver 3 or sample stage 6 so as to view the sample carrier 7 directly without a mirror 9B. In principle, it is also possible for the microscope camera 8 to function as an overview camera when a different objective, in particular a macro-objective, is selected via the objective revolver 3 for the capture of an overview image.

A microscope image in the present disclosure can be understood to be an overview image or sample image. The microscope image can correspond to captured raw data or be formed by means of a processing of the raw data. The computing device 70 comprises a computer program 80 with an image processing program for processing at least one microscope image. The computing device 70 or computer program 80 is configured to execute one of the following examples of a method according to the invention.

FIG. 6

Figure 6:
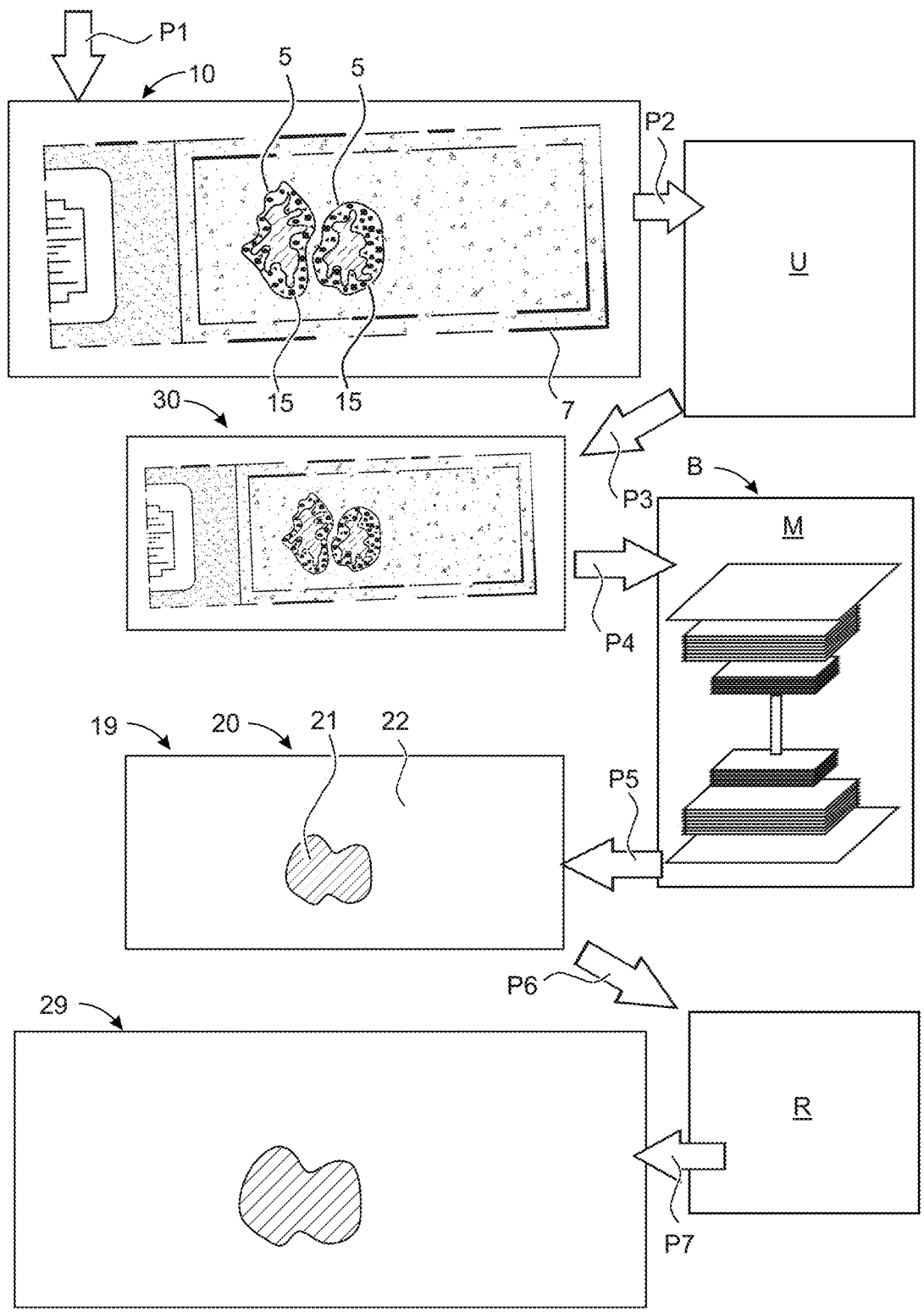
FIG. 6 schematically shows processes of an example embodiment of a method of the invention.

FIG. 6 schematically shows a process of an example embodiment of a method of the invention. A microscope image 10 is first received in process P1, for example from the microscope 1 of FIG. 5 or from a data memory. The microscope image 10 shows, among other things, a sample carrier 7 with sample areas 5.

An image processing program B is intended to create, for the microscope image 10, a segmentation mask in which the sample areas 5 are marked. The sample areas 5 are a concrete example of structures 15 to be detected or analyzed by the image processing program B. However, the microscope image 10 is not input as is into the image processing program B. Rather, the microscope image 10 is input into an image conversion program U in process P2. The image conversion program U converts the microscope image 10 into an image ("input image" 30 in the following), process P3.

In the illustrated example, the image conversion program U performs a resizing of the microscope image 10. Possible approaches for determining a suitable resizing are described in greater detail later on.

The input image 30 is then input into the image processing program B in process P4. In the illustrated example, the image processing program B is constituted by a trained model M for image segmentation. In process P5, the image processing program B generates an image processing result 19, i.e. a segmentation mask 20 in this example, from the input image 30. The segmentation mask 20 in this case is a binary mask in which one or more segmentation areas 21 indicate identified sample areas, while another pixel value indicates a background 22.

The segmentation mask 20 is fed in process P6 to a reverse transformation program R, which performs an operation that is the inverse of the operation by means of which the conversion program U generated the input image 30. In this example, there thus occurs, in process P7, a resizing by means of which an output image 29 generated from the segmentation mask 20 has the same size (the same pixel count) as the microscope image 10.

The conversion of the microscope image 10 to a suitable size by the image conversion program U allows processing errors of the image processing program B—as described in the introductory portion of the description with reference to FIGS. 1 to 4—to be avoided. An illustrative operation of the image conversion program U is described in the following with reference to FIG. 7.

FIG. 7

Figure 7:
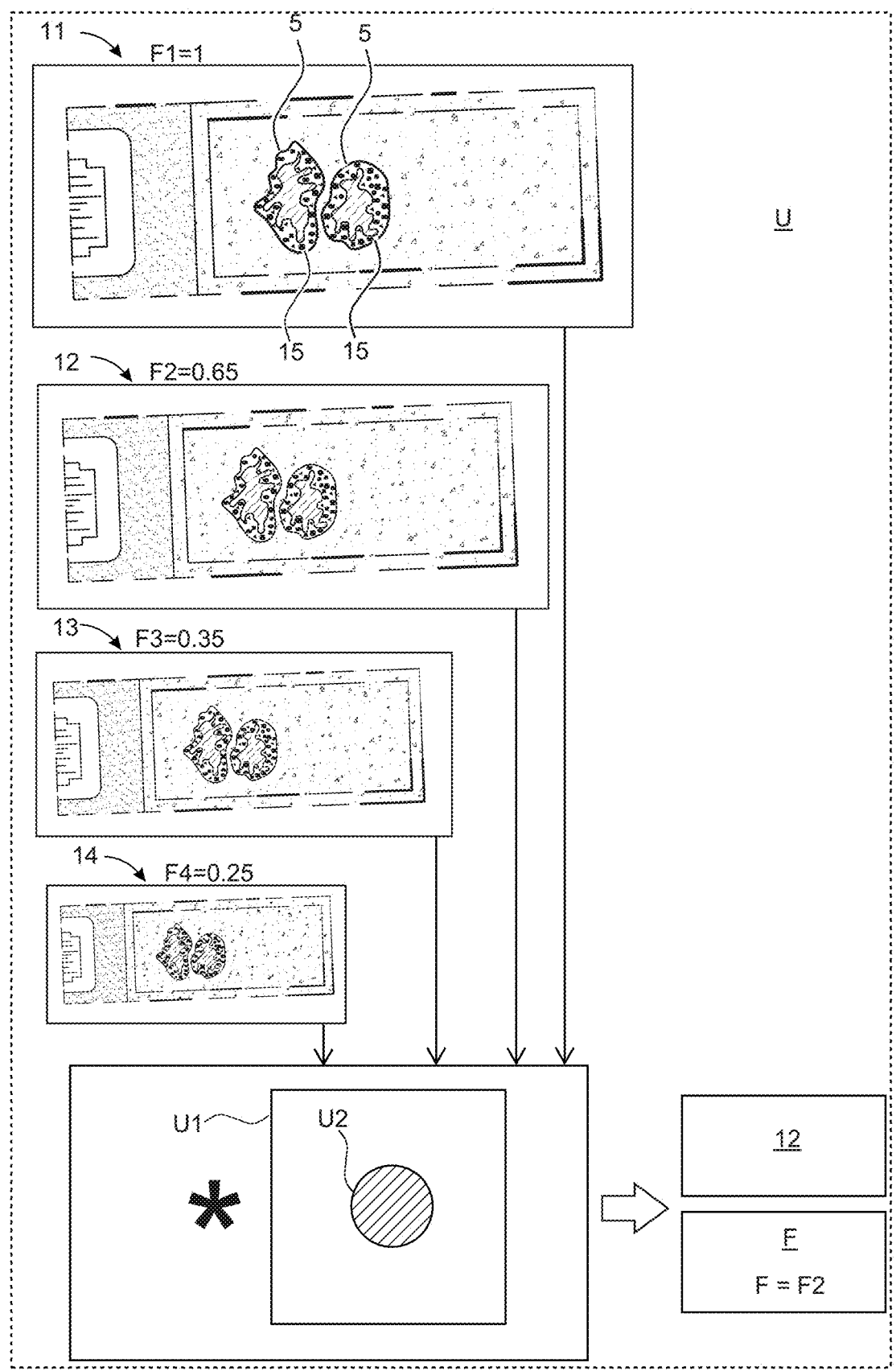
FIG. 7 schematically shows processes carried out by an image conversion program in variants of the invention.

FIG. 7 illustrates functions of the image conversion program U according to example embodiments of the invention. That a given image processing program, e.g. the image processing program B of the previous figure, is generally capable of processing structures 15 of a certain size correctly whereas errors occur more frequently with structures of other sizes is known in advance. Size is again to be understood as the pixel count of the structures, e.g. the diameter or the area of a structure in pixels. The overall size of the microscope image is not decisive. The physical size of the structure, e.g. the spatial dimensions of the sample 5 in μm, is likewise not decisive here.

The image conversion program U generates a plurality of differently sized images 11, 12, 13 and 14 from the microscope image 10 of the previous figure. Corresponding scaling factors F1, F2, F3 and F4 for these images 11-14 can be, e.g., F1=1, F2=0.65, F3=0.35 and F4=0.25. The images 11-14 constitute potential input images for the image processing program B so that their suitability for processing by the image processing program B is ideally verified. To this end, the images 11-14 are respectively convolved with a template U1 that has a structure U2 of the size (in pixels) for which it is known that the image processing program B generally delivers error-free results. In the convolution calculation for the image 11, the template U1 is thus slid over the image 11 and the pixels of the template U1 and the section of the image 11 that are currently superimposed are respectively multiplied with one another and these products are then added to form an image point of the convolution result. The image produced by this convolution has a large amplitude/peak (i.e. a pixel value that deviates considerably) when the size of the structure U2 corresponds to a size of structures of the image 11. The convolution result with the greatest amplitude exhibits approximately the best correspondence of its structures with the size of the structure U2. The associated image, the image 12 in this example, is selected as the input image for the image processing program B. In other words, the scaling factor F selected to compute the input image from the microscope image is the scaling factor F2 in this example.

An alternative implementation of an image conversion program U is explained with reference to the following figure.

FIG. 8

Figure 8:
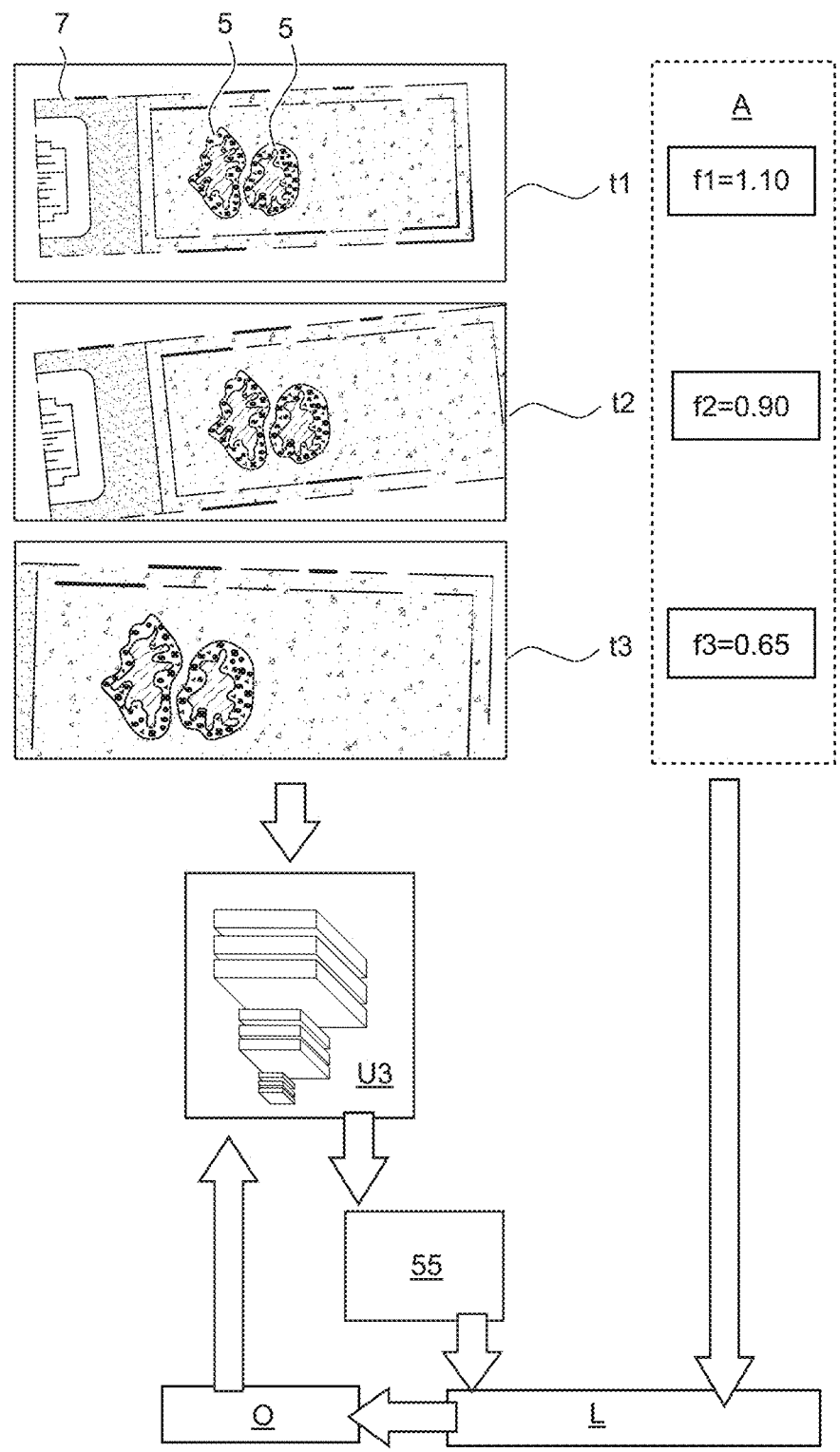
FIG. 8 schematically shows a training process for a model for image conversion, according to example embodiments of the invention.

FIG. 8 schematically illustrates a training process for a model for image conversion U3 that is part of an image conversion program U.

Training data of the model U3 comprises a plurality of images, of which the images t1-t3 are schematically illustrated by way of example. The images t1-t3 show a sample carrier 7 with a sample 5 and differ in particular in terms of the respective sizes of the depicted samples 5 in image pixels. Annotations A for the images t1-t3 respectively indicate a value of an image property. In this example, respective scaling factors f1, f2 and f3 are predetermined. In order to predetermine a scaling factor, e.g. f1, a plurality of image versions of the image t1 can be created in a preceding step using different scaling factors, the created image versions subsequently being respectively processed with the image processing program B. A user then selects the scaling factor of the image version whose image processing result was rated as the best by the user, in the form of the annotation for the image t1. However, it is also possible for the annotations to have been determined in some other way.

The training of the model U3 using the images t1-t3 and the associated scaling factors f1-f3 as target data can occur in essentially any manner. In principle, the architecture of the model U3 can also be of any kind. In the illustrated case, the model U3 comprises a deep neural network, e.g. in the architecture of a convolutional neural network. By means of the training, model parameter values of the model U3, for example values of kernels of a CNN, are iteratively adjusted. The model U3 respectively calculates an output 55 for the images t1-t3 based on current model parameter values. In this example, the output 55 is a number intended to represent the scaling factor for the input image. A loss function L captures a difference between the outputs 55 and the predetermined scaling factors f1-f3. Based on the loss function, a predetermined optimization function O determines iteratively how the model parameter values are to be modified in order to minimize the loss function L. Upon completion of the training, the model U3 is able to calculate a scaling factor for an unknown microscope image that lies within a statistical distribution of the images t1-t3.

By means of the scaling factor, structures of the microscope image are rendered to an image size suitable for the image processing program. In addition to the image size of structures, it is also possible for other image properties of structures to have a relevant impact on whether the image processing program can process the corresponding images correctly. These are discussed in greater detail with reference to FIG. 9.

FIG. 9

Figure 9:
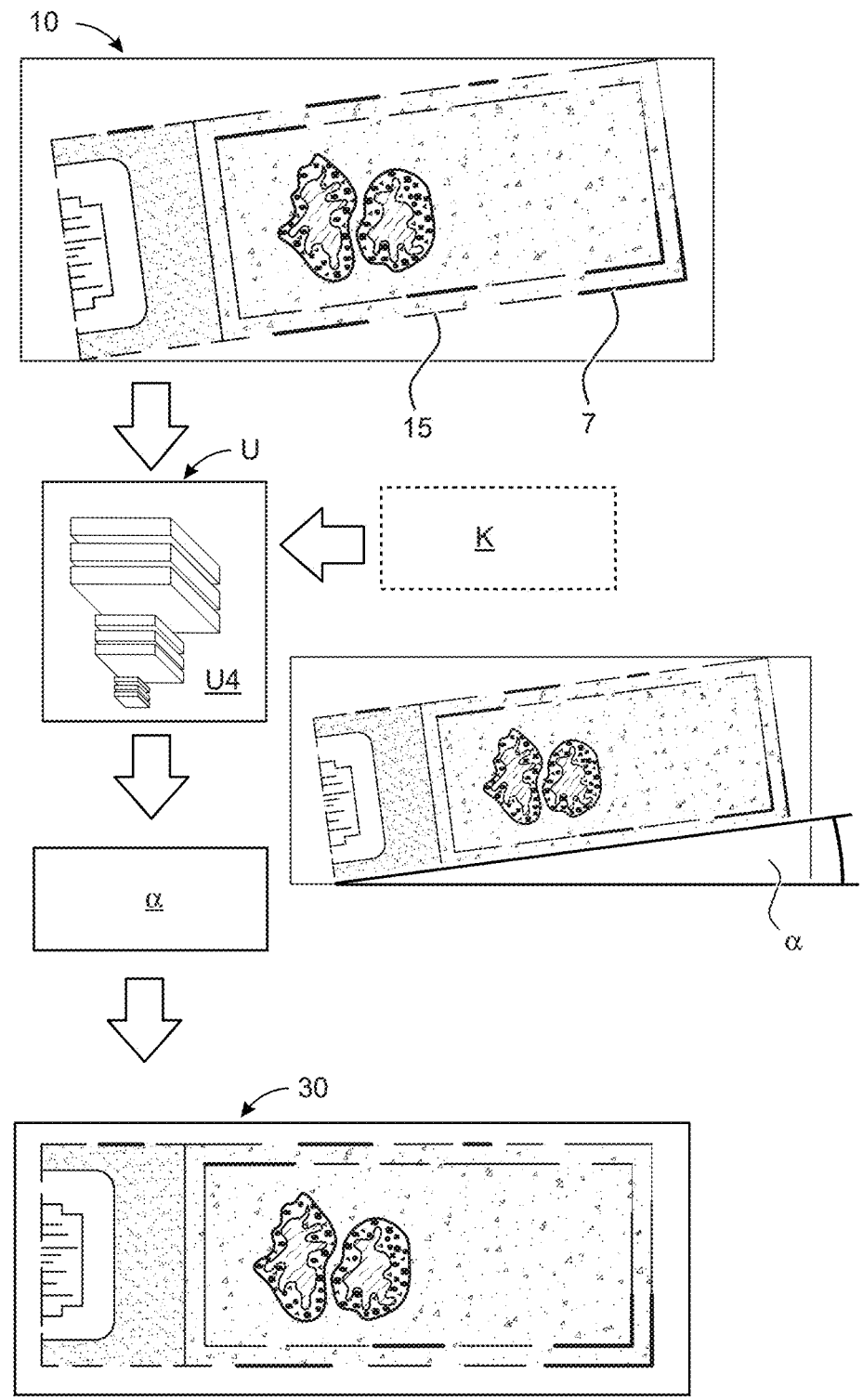
FIG. 9 schematically illustrates the function of a model for determining image properties, according to example embodiments of the invention.

In the example shown in FIG. 9, an image property of structures 15 of a microscope image 10 is also to be modified in order to enable a better processing by means of an image processing program, e.g. by means of the image processing program B of the preceding examples. In this example, the sample carrier 7 constitutes the structures 15 of which an image property is to be modified. An orientation or alignment of the sample carrier 7 within the microscope image 10 differs from orientations in which the image processing program reliably delivers correct results. The image conversion program U comprises a trained model U4 for determining image properties, namely for establishing an orientation of certain structures 15 (here of the sample carrier 7) within the microscope image 10. The model U4 outputs an angle $\alpha$, which indicates an orientation of an edge of the sample carrier 7 relative to, e.g., an image edge of the microscope image 10. With the knowledge of the angle $\alpha$, it is possible to rotate the microscope image 10 so as to form the input image 30. The sample carrier 7 is thus brought into a predetermined orientation within the image, e.g. via a rotation by an angle $-\alpha$ to an orientation parallel to the image edge.

The model U4 can optionally be trained to also take contextual information K into account in the determination of the orientation. The contextual information K can be, e.g., the indication of an employed objective type or its magnification. This indication facilitates an interpretation of which edges in the image could be sample carrier edges.

Generally speaking, it is not relevant whether edges of the sample carrier 7 are oriented so as to be parallel to the image edge, but rather whether the orientation of the sample carrier 7 corresponds as closely as possible to the orientations of sample carriers in training images of the image processing program B. This is because the quality of an image processing result of the image processing program B primarily depends on whether an input image lies within the statistical distribution of the training images. This is discussed in greater detail with reference to the following figure.

FIG. 10

Figure 10:
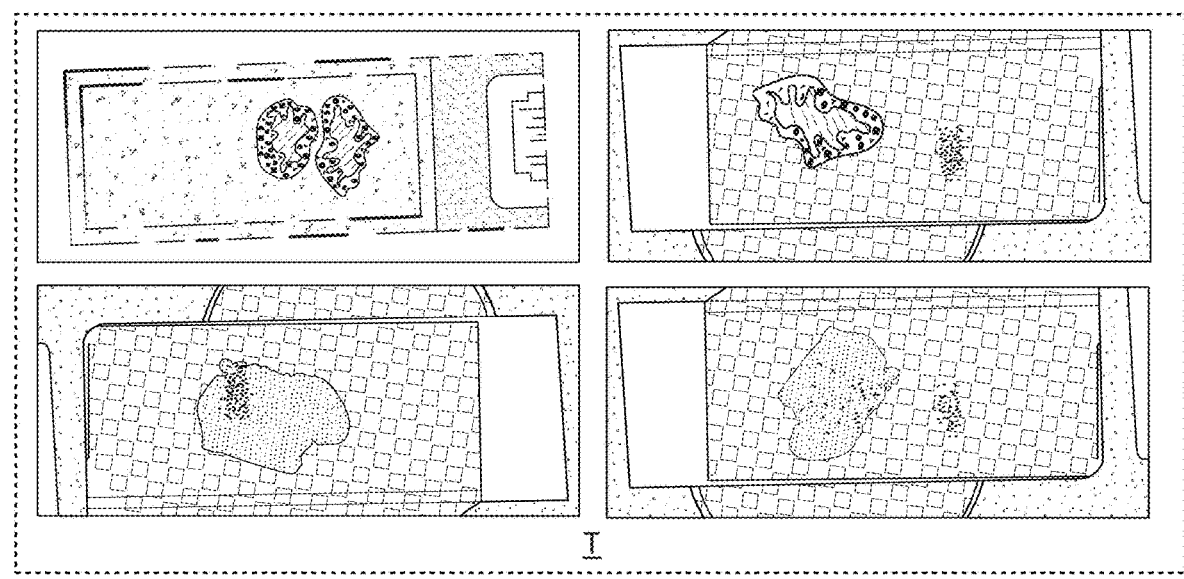
FIG. 10 schematically illustrates frequencies of image properties in training images of an image processing program, according to example embodiments of the invention.
Figure 10:
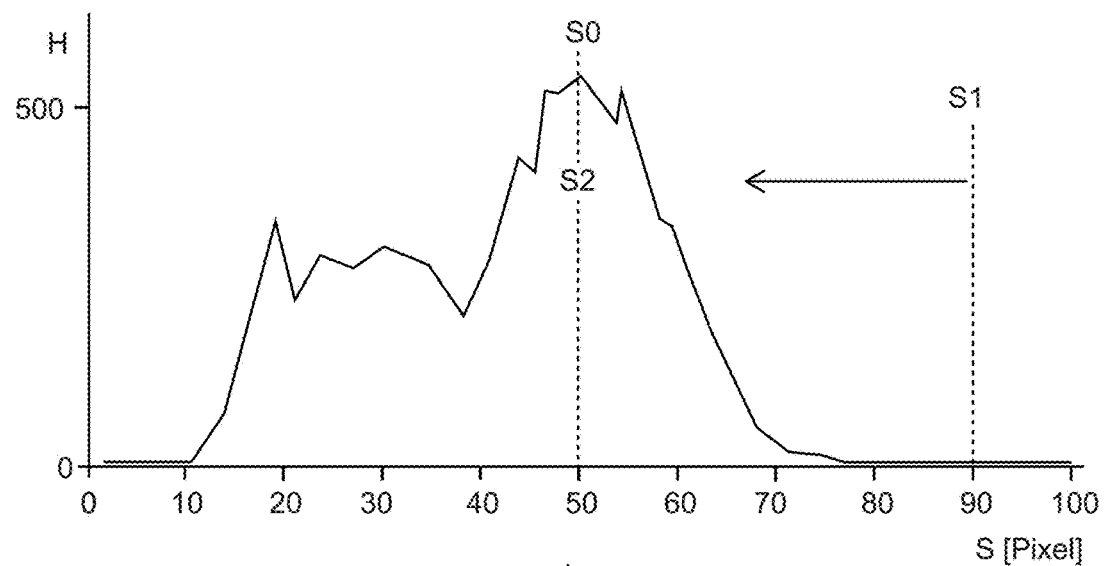
Figure 10:
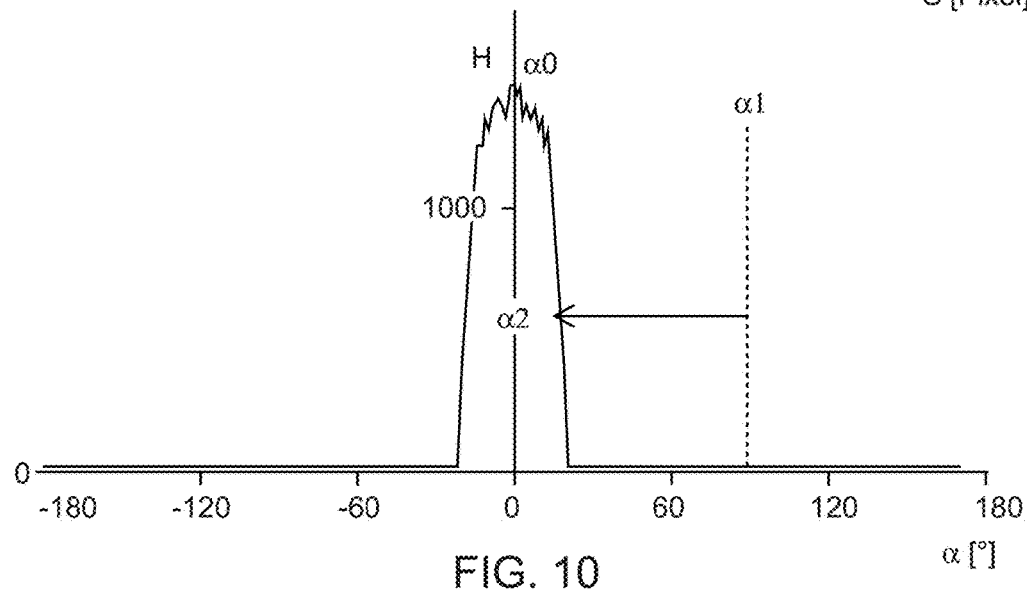

FIG. 10 schematically shows training images T with which the model M for image processing of the image processing program B is learned. The training images T respectively show a sample carrier with a sample as examples of structures that are generally depicted. Annotations relating to the training images are not shown here and are chosen depending on the intended function of the image processing program B. For example, target images or a "ground truth" can be predetermined for the training images T in the form of segmentation masks when a model for image segmentation is to be learned. Alternatively, a classification can be predetermined, e.g. "sample present" or "sample not present", or a classification regarding the sample carrier type, e.g. "slide", "microtiter plate" or "chamber slide".

Depending on the application, thousands or many millions of training images T can be necessary. A range or statistical distribution of the training images T should cover the spectrum of expected image content of the microscope image. FIG. 10 schematically shows a plotted distribution (frequency distribution) of a frequency H (i.e., a number or count) with which a certain size S of samples occurs in the training images T. The size S of the samples in pixels is a concrete example of image properties of a structure in the training images T. The size of the samples as measured in pixels can be, e.g., a maximum diameter, an area or some other size dimension of a sample. In this example, the training images cover sample sizes between 15 and 65 pixels, while sample sizes outside this range are infrequent or not represented at all in the training images. Most frequently present in the training images are samples with a size S0 of approximately 50 pixels. By means of such data, a model can be learned that is likely to deliver high-quality image processing results with sample sizes within a certain working range, between 15 and 65 pixels in this case. For other sample sizes, there is a higher risk of erroneous results.

For example, if a microscope image is to be processed in which a sample has a size S1 of 90 pixels, this size S1 is relatively far away from the sizes of the samples of the training images T. The image conversion program converts the microscope image so that the size S1 is brought closer to the size of the samples in the training images. For example, the most frequently occurring size S0 or an average value of the occurring sample sizes can be used as a measure of the sample size in the training images. In the case of a frequency distribution with a plurality of separate peaks, it is also possible to use the respective value of S at a local maximum or a respective average value of S for each peak as a measure of the sample size. Thus, by means of a resizing, an image (input image) in which the sample has a size S2 is calculated from a microscope image in which the sample has a size S1, wherein S2 is a target size or target image property and is set, e.g., so as to be equal to the most frequently occurring size S0 of the training images.

The size S of the samples is a concrete example of an image property of the samples. As already established in the foregoing, it does not relate to a physical property of the samples, i.e. not to their actual size, but to their depiction in the microscope image. The frequency distribution shown in FIG. 10 illustrates in addition that the overall size of the microscope image does not constitute a more relevant measure. For example, if objectives with different magnifications are switched, the overall sizes of captured microscope images remain the same, while the size S in pixels of a sample changes. Training images for every magnification would have to be available for such cases in the absence of the described image conversion. This becomes unnecessary with the image conversion, however, which brings the image properties of samples or other structures of a microscope image closer to the image properties of the structures of the training images.

FIG. 10 also shows a frequency distribution H of the occurring orientations of the sample carriers in the training images T, wherein the orientation can be defined as an angle α between an edge of the sample carrier and an image edge. The training images T do not have to cover all conceivable angles between −180° and +180°. Rather, a relatively small range of angles between, e.g., −20° and +20° suffices. A most frequently occurring angle α0 is approx. 0° in this example. If an angle α1 of, e.g., 90° is established in a microscope image, the microscope image is rotated so that the resulting angle α2 is closer to the angles that occur in the training images. For example, the angle is rotated towards α0 or set exactly to α0, or to an angle within a range of angles for which a definable minimum number of training images is available, which is the case for angles between −20° and +20° in the example shown. Advantageously, by means of such a conversion of a microscope image, significantly fewer training images T are required. In particular, the training images T do not have to cover a large range of angles.

It is thus an achievement of the invention that training images only need to cover a smaller working range of different image properties. As a result, a learned model generally requires fewer parameters to be learned and works faster.

The frequency distributions shown in FIG. 10 serve the purpose of illustrating the invention. It is not necessarily required that these frequency distributions should be determined.

In addition to orientation and size, the described approach can also be employed for other image properties, for example for the brightness or brightness distribution of a structure. In addition to samples and sample carriers, the structure can also be some other—in principle any—object to be analyzed by the image processing program. The function of the image processing program is described purely by way of example and can be replaced by other functions, for example by the implementations cited in the general part of the description.

FIG. 11

Figure 11:
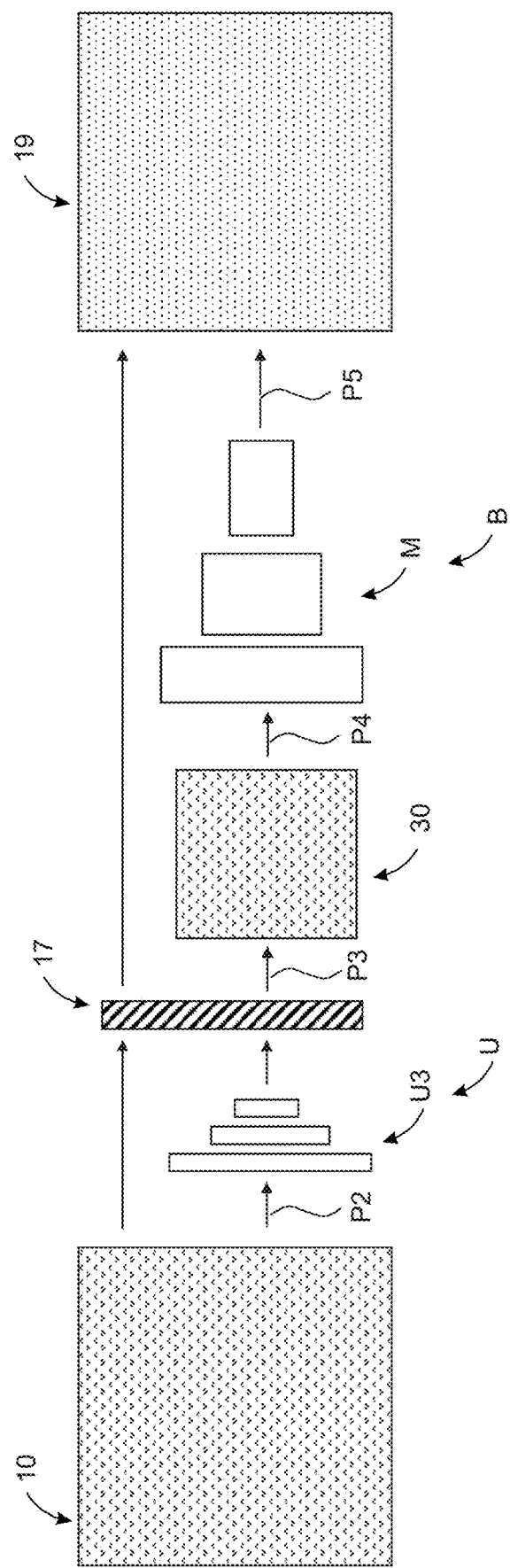
FIG. 11 schematically illustrates processes of a further example embodiment of a method of the invention.

FIG. 11 schematically shows a process of a further example embodiment of a method of the invention. A model for image conversion U3 (scaling network) and a model for image processing M are used here as well. However, the models are not separate, but form a joint model. In this model, the microscope image 10 runs through two parallel progressions/threads: In one progression, the microscope image 10 is input into the model for image conversion U3 (process P2), which determines therefrom a suitable scaling factor (or, more generally, a suitable value of an image property). In the other progression, the microscope image 10 is input together with the determined scaling factor into a parameterized scaling layer 17, which in process P3 calculates an image therefrom, which is called the input image 30 in the following. In the more general case in which a value of a (different) image property is determined instead of a scaling factor, an image manipulation layer is generally used instead of the scaling layer 17, the image manipulation layer modifying the input microscope image 10 based on the value of the image property. For example, in cases where the image property is an angle of rotation, the microscope image 10 is rotated accordingly in order to calculate an input image 30.

In process P4, the input image 30 is input into the model for image processing M, which calculates an image processing result 19 from the same in process P5. If the image processing result 19 is a result image, the operation performed by the scaling layer 17/image manipulation layer is reversed. In particular the same image size as that of the microscope image 10 is thereby obtained.

The two models U3 and M constitute submodels of an aggregate model and are trained simultaneously. The training images comprise, for example, a plurality of differently scaled images; otherwise, their image content is identical. The different scaling can be generated optically, e.g., by means of a zoom objective or objectives with different magnifications. Alternatively, the scaling can be calculated artificially from a source image. For the training, two annotations (ground truth information) are specified for each image: one annotation specifies the target result of the image processing (i.e., an image processing result 19), while the other annotation specifies a scaling factor. In cases where artificial scaling is used to generate the training images, scaling factors inverse to the artificial scaling are specified in the form of annotations so that the training images are scaled to a common size of depicted structures. Alternatively, the scaling factor can be specified manually for each training image. The training is now carried out with a combined optimization function, e.g. a loss function, which comprises both the output of the model for image processing M and the output (intermediate output) of the model for image conversion U3. For both outputs, a difference from the associated annotation is taken into account in the joint optimization function. An end-to-end learning is thus implemented, whereby the learned models generally differ from cases where the models are respectively learned in a separate training. In the training, input images of the model for image processing comprise, for example, not only perfectly scaled input images potentially corresponding to a ground truth information, but also images with a divergent scaling as generated by the model for image conversion U3 in the course of training. This renders the model for image processing M generally more robust to variations that can occur in normal operation as the result of different scaling by the model for image conversion U3.

The described example embodiments are purely illustrative and variants of the same are possible within the scope of the attached claims.

LIST OF REFERENCE SIGNS

1 Microscope
2 Stand
3 Objective revolver
4 Microscope objective
5 Sample(s)
6 Sample stage
7 Sample carrier
8 Microscope camera
9 Overview camera
9A Field of view of the overview camera
9B Mirror
10 Microscope image
10A-10D Differently scaled images
11-14 Differently scaled images (potential input images)
15 Structures
16 Illumination device
17 Scaling layer
19 Image processing result of the image processing program B 20A-20D Segmentation masks for the images 10A-10D
21 Areas of a segmentation mask identified as sample areas
22 Areas of a segmentation mask identified as background
29 Rescaled result image of the image processing program B
30 Input image for the image processing program B
55 Current output of the model U3
70 Computing device
80 Computer program of the invention
100 Microscopy system of the invention
A Annotations
B Image processing program
f1-f3 Annotated scaling factors
F, F1-F4 Scaling factors
H Frequency (Count) of the occurrence of a value of an image property in the training images
K Contextual information
L Loss function
M Learned model for image processing
Optimization function
P1-P7 Processes of a method of the invention
R Reverse transformation program
S Size of a sample/structure by way of example of an image property
S0 Most frequent size of the samples in the training images
S1 Size of the sample in a microscope image
S2 Size of the sample in the input image
T Training images
t1, t2, t3 Images for the training of the model U3
U Image conversion program
U1 Template of the image conversion program U
U2 Structure of the template U1
U3 Learned model for image conversion
U4 Learned model for determining image properties
α Angle of the sample carrier or orientation of a structure by way of example of an image property
α0 Most frequent angle of the sample carrier in the training images
α1 Angle of the sample carrier in a microscope image
α2 Angle of the sample carrier in the input image

What is claimed is:

1. A method for processing a microscope image, comprising receiving a microscope image;
inputting an input image formed from the microscope image into an image processing program comprising a learned model for image processing which has been trained to calculate image processing results from input training images that show structures with certain image properties;
calculating an image processing result from the input image by the image processing program;
receiving a size of structures in the microscope image in pixels;
wherein a target size of structures in pixels is given;
calculating a scaling factor by which the size of structures is converted to the target size of structures in pixels; and
converting the microscope image into the input image by an image conversion program in such a manner that image properties of structures in the input image are modified with respect to image properties of the structures in the microscope image so that they are closer to the image properties of the structures in the input training images, the converting including rescaling the microscope image with the scaling factor to generate the input image.

2. The method according to claim 1,
wherein image properties of the structures are geometry properties and/or brightness properties of the structures.

3. The method according to claim 2,
wherein the geometry properties of the structures comprise a size, orientation or image distortion;
wherein the brightness properties relate to a brightness, a saturation or an image contrast of the structures.

4. The method according to claim 1,
wherein the image conversion program determines the image properties of the structures in the microscope image,
wherein target image properties are predetermined for image properties of structures of in microscope images,
wherein the image conversion program changes the determined image properties to the target image properties, in order to calculate the input image from the microscope image.

5. The method according to claim 1, further including determining the size of structures of in the microscope image in pixels by image analysis of the microscope image.

6. The method according to claim 1,
wherein the image conversion program comprises a learned model for determining image properties that is trained using training images to determine image properties of structures in microscope images.

7. The method according to claim 1,
wherein the image conversion program is a learned model for image conversion that is trained using images for which it is specified in the form of annotations how these images are to be converted in order to form input images.

8. The method according to claim 7,
wherein the annotations respectively indicate a scaling factor.

9. The method according to claim 1,
wherein the image conversion program is a learned model for image conversion, and
wherein the learned model for image conversion and the learned model for image processing are trained by a joint training with a joint optimization function.

10. The method according to claim 1,
wherein the image conversion program, in order to determine a suitable conversion of the microscope image into the input image, tests a plurality of potential conversions, which are respectively applied to the microscope image in order to generate potential input images, wherein image properties of structures in the potential input images are subsequently evaluated according to a predetermined criterion and the potential input image with the best evaluation is selected as the input image.

11. The method according to claim 1,
wherein the image conversion program takes into account contextual information regarding the microscope image when calculating the input image, the contextual information indicating one or more of the following:
microscope settings, a magnification of an employed objective, illumination properties or camera properties;
information regarding a measurement situation, an employed sample carrier type or an employed sample type.

12. The method according to claim 1,
wherein the learned model for image processing calculates, for the input image, a classification, an image segmentation, a detection, an image enhancement, a reconstruction of image areas or an image-to-image mapping.

13. The method according to claim 1,
wherein the image processing result is a result image and wherein a conversion of the result image is performed that is inverse to the conversion by which the image conversion program generates the input image from the microscope image.

14. A non-transitory computer-readable medium storing a computer program with commands that, when executed by a computer, cause the execution of the method of claim 1.

15. A microscopy system comprising a microscope for capturing a microscope image; and
a computing device, which comprises an image processing program that is configured to process an input image formed from the microscope image into an image processing result, wherein the image processing program comprises a learned model for image processing which is trained to calculate image processing results from input training images that show structures with certain image properties;
wherein the computing device comprises an image conversion program configured to convert the microscope image into the input image in such a manner that image properties of structures in the input image are modified with respect to image properties of the structures in the microscope image so that they are closer to the image properties of the structures in the input training images;
wherein the image conversion program is a machine-learned model for image conversion that is trained using images as inputs and scaling factors as annotations specifying how these images shall be rescaled to form input images for the image processing program,
wherein the machine-learned model for image conversion calculates a mapping of the microscope image to a scaling factor which is then used by the computing device to rescale the microscope image to form the input image for the image processing program.

16. The microscopy system of claim 15,
wherein image properties of the structures are geometry properties and/or
brightness properties of the structures.

17. The microscopy system of claim 15,
wherein the image conversion program determines the image properties of the structures in the microscope image,
wherein target image properties are predetermined for image properties of structures in microscope images,
wherein the image conversion program changes the determined image properties to the target image properties, in order to calculate the input image from the microscope image.

18. The microscopy system of claim 15,
wherein the image conversion program determines a size of structures of in the microscope image in pixels as an image property,
wherein a target size of structures in pixels is predetermined as a target image property,
wherein the image conversion program calculates a scaling factor by which the determined size of the structures in pixels is converted to the target size of structures in pixels,
wherein the image conversion program processes the microscope image with the scaling factor in order to generate the input image.

19. The microscopy system of claim 15,
wherein the image conversion program comprises a learned model for determining image properties that is trained using training images to determine image properties of structures in microscope images.

20. The microscopy system of claim 15,
wherein the image conversion program is a learned model for image conversion that is trained using images for which it is specified in the form of annotations how these images are to be converted in order to form input images.

21. A method for processing a microscope image, comprising
inputting an input image formed from a microscope image into an image processing program comprising a learned model for image processing which has been trained to calculate image processing results from input training images that show structures with certain image properties;
calculating an image processing result from the input image by the image processing program; and
converting the microscope image into the input image by an image conversion program in such a manner that image properties of structures in the input image are modified with respect to image properties of the structures in the microscope image so that they are closer to the image properties of the structures in the input training images, the converting including rescaling the microscope image to generate the input image;
wherein the image conversion program includes a learned model for image conversion that is trained using images for which it is specified in the form of annotations how these images are to be converted in order to form input images.

22. The method of claim 21, further including:
calculating a scaling factor by which the size of structures is converted to a target size of structures in pixels.

* * * * *